(12) United States Patent
Usoro

(10) Patent No.: US 7,547,264 B2
(45) Date of Patent: Jun. 16, 2009

(54) STARTER ALTERNATOR ACCESSORY DRIVE SYSTEM FOR A HYBRID VEHICLE

(75) Inventor: Patrick B. Usoro, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 400 days.

(21) Appl. No.: 11/464,271

(22) Filed: Aug. 14, 2006

(65) Prior Publication Data

US 2008/0039263 A1 Feb. 14, 2008

(51) Int. Cl.
*F16H 3/72* (2006.01)
*F16H 37/06* (2006.01)
*B60K 17/28* (2006.01)
*B60K 25/00* (2006.01)

(52) U.S. Cl. ............... 475/5; 475/4; 180/53.5; 180/53.8; 180/65.2; 903/910

(58) Field of Classification Search ...... 475/4, 475/5, 10; 180/53.5, 53.8, 65.2, 65.3; 903/910
See application file for complete search history.

(56) References Cited

U.S. PATENT DOCUMENTS

| | | | | |
|---|---|---|---|---|
| 5,558,173 A * | 9/1996 | Sherman | ................. | 180/53.8 |
| 5,669,842 A * | 9/1997 | Schmidt | ................. | 475/5 |
| 6,269,895 B1 * | 8/2001 | Tanuguchi et al. | ...... | 180/65.2 |
| 6,801,842 B2 * | 10/2004 | Egami et al. | ........ | 701/36 |
| 6,863,139 B2 * | 3/2005 | Egami et al. | ........ | 180/53.8 |
| 7,282,003 B2 * | 10/2007 | Klemen et al. | ........ | 475/5 |

* cited by examiner

*Primary Examiner*—Tisha D Lewis

(57) ABSTRACT

The present invention provides an alternator starter accessory drive system for a hybrid vehicle. The starter alternator accessory drive system includes a planetary gear set having a first, second, and third planetary member. An engine is operatively connected to the first planetary member, and a first motor/generator is operatively connected to the second planetary member. A torque transfer device operatively connects a plurality of accessories to the third planetary member. A second motor/generator is operatively connected to either the third planetary member or the torque transfer device. Engine output is transferable through the planetary gear set to drive the accessories at a selectable rate, and the first and second motor/generators are controllable to run the accessories while the engine is off and to re-start the engine.

20 Claims, 5 Drawing Sheets

STARTER ALTERNATOR ACCESSORY DRIVE SYSTEM FOR A HYBRID VEHICLE

TECHNICAL FIELD

The present invention pertains generally to a starter alternator accessory drive system for a hybrid vehicle.

BACKGROUND OF THE INVENTION

Driven accessories in a hybrid vehicle may include, for example, an air conditioning compressor, a power steering pump, and an alternator. These accessories are generally powered by output from the engine. Some of the accessories in a hybrid vehicle may require power while the engine is off and the vehicle is being powered by an electric motor/generator. Traditionally, in order to power hybrid vehicle accessories when the engine is off, it was necessary to provide each such accessory with a separate electric motor. It is also generally necessary to provide a device or system configured to restart the engine after it is turned off.

Conventional automotive accessory drive systems include a drive pulley connected to an engine output shaft. A flexible chain or belt couples the drive pulley with a plurality of driven pulleys that are each operatively connected to an accessory. The operating speeds of the accessories in such a conventional drive system are directly proportional to the speed of the engine. Since the engine operates over a wide speed range (i.e., for example, between 500 rpm and 8,000 rpm), the accessories are typically designed to provide full capacity at the low end of the engine speed range in order to ensure that they remain operational. Therefore, at higher engine speeds, excess energy transferred to the accessories may be lost.

SUMMARY OF THE INVENTION

The present invention provides a starter alternator accessory drive system for a hybrid vehicle. The starter alternator accessory drive system includes a planetary gear set having a first, second, and third planetary member. An engine is operatively connected to the first planetary member, and a first motor/generator is operatively connected to the second planetary member. A torque transfer device operatively connects a plurality of accessories to the third planetary member. A second motor/generator is operatively connected to either the third planetary member or the torque transfer device. Engine output is transferable through the planetary gear set to drive the accessories at a selectable rate, and the first and second motor/generators are controllable to run the accessories while the engine is off and to re-start the engine.

According to the preferred embodiment, the first planetary member is a ring gear member, the second planetary member is a sun gear member, and the third planetary member is a planet carrier member.

According to an alternate embodiment, the first planetary member is a sun gear member, the second planetary member is a planet carrier member, and the third planetary member is a ring gear member.

According to another alternate embodiment, the first planetary member is a ring gear member, the second planetary member is a planet carrier member, and the third planetary member is a sun gear member.

According to another alternate embodiment, the first planetary member is a planet carrier member, the second planetary member is a ring gear member, and the third planetary member is a sun gear member.

According to another alternate embodiment, the first planetary member is a planet carrier member, the second planetary member is a sun gear member, and the third planetary member is a ring gear member.

According to another alternate embodiment, the first planetary member is a sun gear member, the second planetary member is a ring gear member, and the third planetary member is a planet carrier member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Conventional accessory drive systems operate by transferring engine output directly to the accessories so the accessories are driven at a speed directly proportional to engine speed. Since the engine operates over a wide speed range (e.g., between 500 rpm and 8,000 rpm), the accessories are typically designed to provide full capacity at the low end of the engine speed range in order to ensure they remain fully operational. Therefore, when the engine is operating at higher speeds, conventional accessory drive systems transfer more energy to the accessories than necessary to provide adequate function. The excess energy transferred to the accessories causes inefficiency and diminishes fuel economy. The starter alternator accessory drive (SAAD) system 10 (shown in FIG. 1) of the present invention allows the accessories to be driven at a predetermined optimal speed independent from the speed at which the engine is running in order to improve fuel economy.

Figure 1:
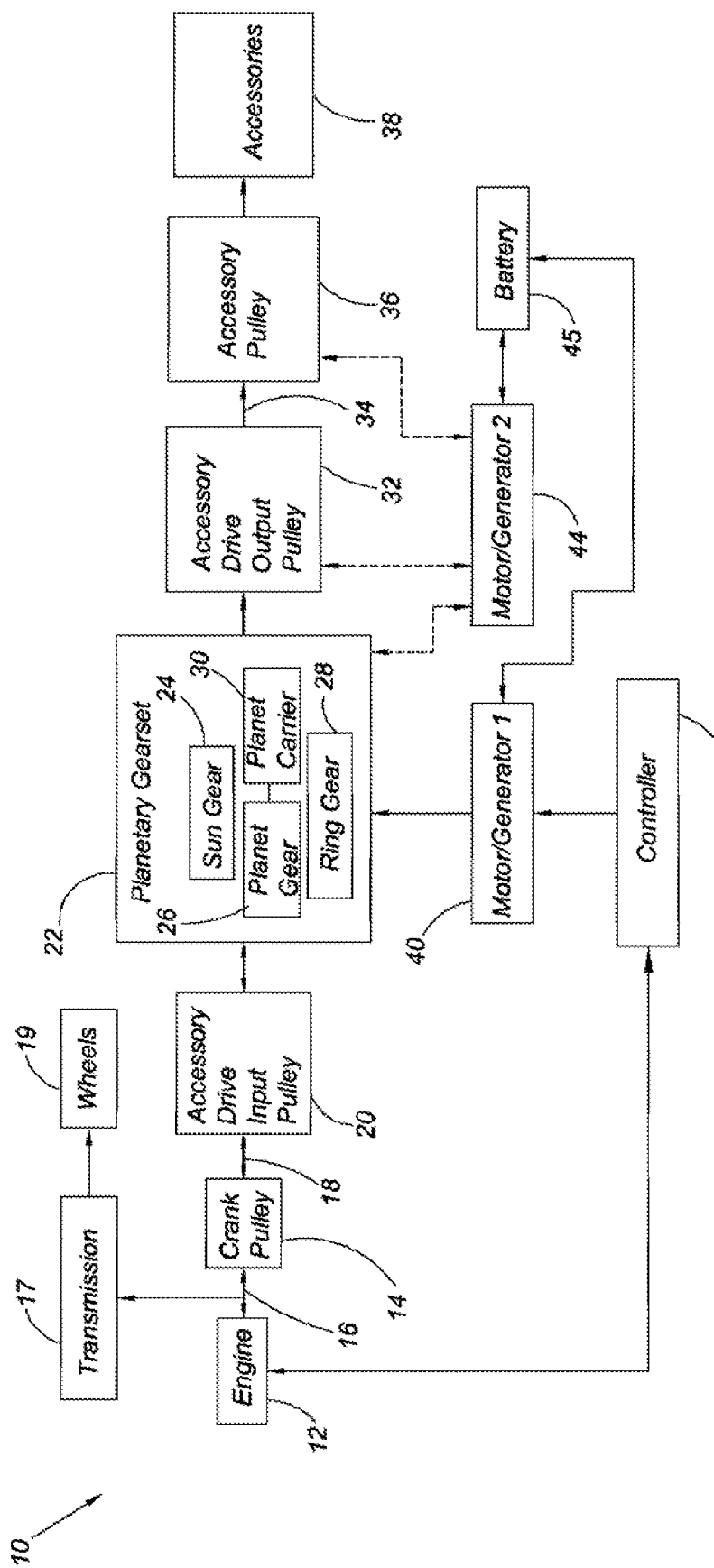
FIG. 1 is a schematic depiction of an accessory drive system for a hybrid vehicle.

Referring to FIG. 1, a schematic representation of a SAAD system 10 for a hybrid vehicle is shown. The SAAD system 10 includes an engine 12 configured to transmit output to a crank pulley 14 via a crankshaft or output shaft 16. A first belt or chain 18 couples the crank pulley 14 with an accessory drive input pulley 20. The accessory drive input pulley 20 is operatively connected to a differential transmission such as the planetary gear set 22. The planetary gear set 22 has a plurality of members including: a sun gear 24; a plurality of pinions or planet gears 26; a ring gear 28; and a pinion carrier or planet carrier 30.

The engine 12 also transfers output via the crankshaft 16 to a transmission 17. The transmission 17 transfers output from the engine 12 to a plurality of wheels 19 in order to drive a hybrid vehicle. It should be appreciated that the transmission 17 and wheels 19 may include any known configurations and are not included as part of the SAAD system 10 of the present invention.

The planetary gear set 22 is configured to convert the rotational speed of the accessory drive input pulley 20 (which runs at a fixed ratio of engine speed) to a predetermined value selected to efficiently drive the accessories 38. In other words, the planetary gear set 22 can selectively increase or decrease the magnitude of the rotational speed from the accessory drive input pulley 20 in order to drive the accessories 38 at more efficient speed and thereby improve fuel economy. Output from the planetary gear set 22 is transferred to an accessory drive output pulley 32. A second belt or chain 34 couples the accessory drive output pulley 32 with one or more accessory pulleys 36. The accessory pulley 36 are each operatively connected to an accessory 38.

The SAAD system 10 includes a first motor/generator 40 and a second motor/generator 44. The first motor/generator 40 is configured to selectively transfer torque to and/or receive torque from the planetary gear set 22, either directly or through a transfer device such as, for example, a belt, chain, gear set, differential gear, etc. The first motor/generator 40 is configured to receive power from and/or transfer power to a storage device such as the battery 45. The second motor/generator 44 is configured to selectively transfer torque to and/or receive torque from the planetary gear set 22, the accessory drive output pulley 32; or one of the accessory pulleys 36, either directly or through a torque transfer device such as, for example, a belt; chain; gear set; differential gear; etc. The second motor/generator 44 is configured to receive power from and/or transfer power to a storage device such as the battery 45. The first and second motor/generators 40, 44 are configured to selectively operate as a motor, a generator, or they can be turned off to reduce rotational resistance.

The first and second motor/generators 40, 44 are controllable to drive the accessories 38 at a predetermined rate regardless of engine speed. As is known in the art, by transferring a first predetermined amount of input torque from the engine 12 to one of the planetary gear set 22 members, and transferring a second predetermined amount of input torque from one of the motor/generators 40, 44 to another of the planetary gear set 22 members, the planetary gear set 22 can be controlled to produce a selectable amount of output torque from yet another of its members. Therefore, by controlling the status of the motor/generators 40, 44 (i.e., either "motor", "generator", or "off"), and the amount of output from the motor/generators 40, 44, the planetary gear set 22 output speed is selectable within an operational range.

The first and second motor/generators 40, 44 are controllable to drive the accessories 38 when the engine 12 is off. Therefore, the accessories 38 remain operational even when the hybrid vehicle is being powered exclusively by an alternate power source (not shown) in order to conserve fuel. When the engine 12 is off, one of the motor/generators 40, 44 is preferably run as a motor, and the other of the motor/generators 40, 44 is preferably run as a generator; however alternate operational modes may be envisioned. Conventional hybrid vehicle accessory drive systems typically implement individual electric motors for each accessory in order to power the accessories when the engine is off. The SAAD system 10 of the present invention may reduce cost as compared to conventional systems by implementing fewer components (i.e., two motor/generators 40, 44) to drive all the accessories 38.

The first and second motor/generators 40, 44 are also controllable to re-start the engine 12. Advantageously, the first and second motor/generators 40, 44 can drive the accessories 38 when the engine 12 is being re-started such that there is no interruption of accessory 38 operation. More precisely, by controlling the first and second motor/generators 40, 44, output therefrom is transferable to the accessories 38 such that the accessories 38 remain powered, and to the engine 12 such that the engine 12 is driven. As the engine 12 is being driven by the motor/generators 40, 44, a controller such as the controller 42 can introduce engine spark (not shown) to re-start the engine 12.

The engine 12, the first motor/generator 40, and the second motor/generator 44 are operatively connected to a controller 42. The controller 42 receives input from the engine 12 indicating the current engine speed and calculates corresponding speed and torque output values for the motor/generators 40, 44 required to produce a predetermined planetary gear set 22 output speed. As an example, if the engine 12 is running at 4,000 rpm and the accessories 38 are optimized to run at 1,000 rpm, the controller 42 calculates the speed and amount of torque transfer from the motor/generators 40, 44 required to produce a planetary gear set 22 output speed of 1,000 rpm. These types of calculations are well known to those skilled in the art and therefore will not be described in detail hereinafter. After calculating, the controller 42 commands the desired operational status and torque outputs from the motor/generators 40, 44 such that the accessories 38 are driven in an optimally efficient manner.

Having explained the components and functionality of the SAAD system 10, the precise interconnection of these components will now be described in accordance with a plurality of different embodiments. FIGS. 2-11 each illustrate a separate embodiment that functions similarly to the previously described SAAD system 10, but includes somewhat different component connections. Like reference numbers are used in FIGS. 2-9 to refer to like components from FIG. 1. Additionally, the letters "a" through "h" added as a suffix to a reference numeral identifies a similar component in a different embodiment. As an example, the engine 12 of FIG. 1 functions similarly to the engines 12a-12h of FIGS. 2-9, respectively. Therefore, unless specified otherwise, the components of FIGS. 2-9 identified with a base reference number followed by one of the letters "a" through "h" should be considered to be identical to a respective component of FIG. 1 identified with a common base reference number.

Figure 2:
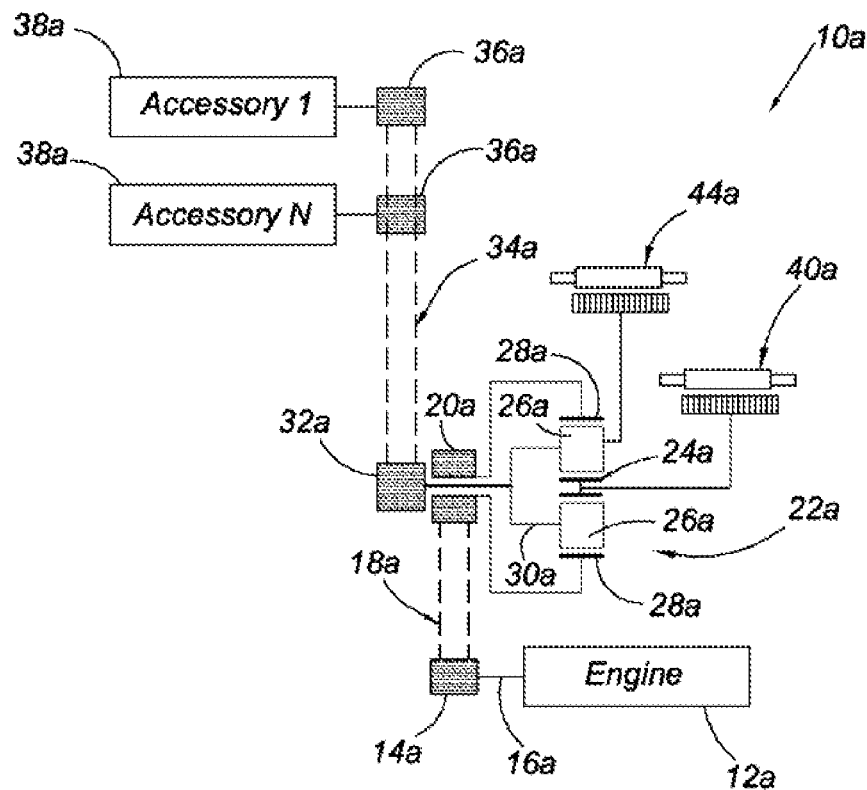
FIG. 2 is a more detailed schematic depiction of the accessory drive system of FIG. 1 in accordance with the preferred embodiment of the present invention.

Referring to FIG. 2, a SAAD system 10a is shown in accordance with the preferred embodiment of the present invention. The accessory drive input pulley 20a (which runs at a fixed ratio of engine speed) is operatively connected to the ring gear 28a of the planetary gear set 22a. The first motor/generator 40a is operatively connected to the sun gear 24a of the planetary gear set 22a. The second motor/generator 44a is operatively connected to the planet carrier 30a of the planetary gear set 22a. The planet carrier 30a of the planetary gear set 22a is also operatively connected to the accessory drive output pulley 32a. Therefore, in response to input from the engine 12a (via the ring gear 28a), the first motor/generator 40a (via the sun gear 24a) and/or the second motor/generator 44a (via the planet carrier 30a), the planetary gear set 22a can transfer output to the accessory drive output pulley 32a (via the planet carrier 30a) and thereby drive the accessories 38a at a selectable rate. When the engine 12a is off, the motor/generators 40a, 44a are controllable to transfer torque via the sun gear 24a and the planet carrier 30a, respectively, in order to power the accessories 38a and/or to re-start the engine 12a.

Figure 3:
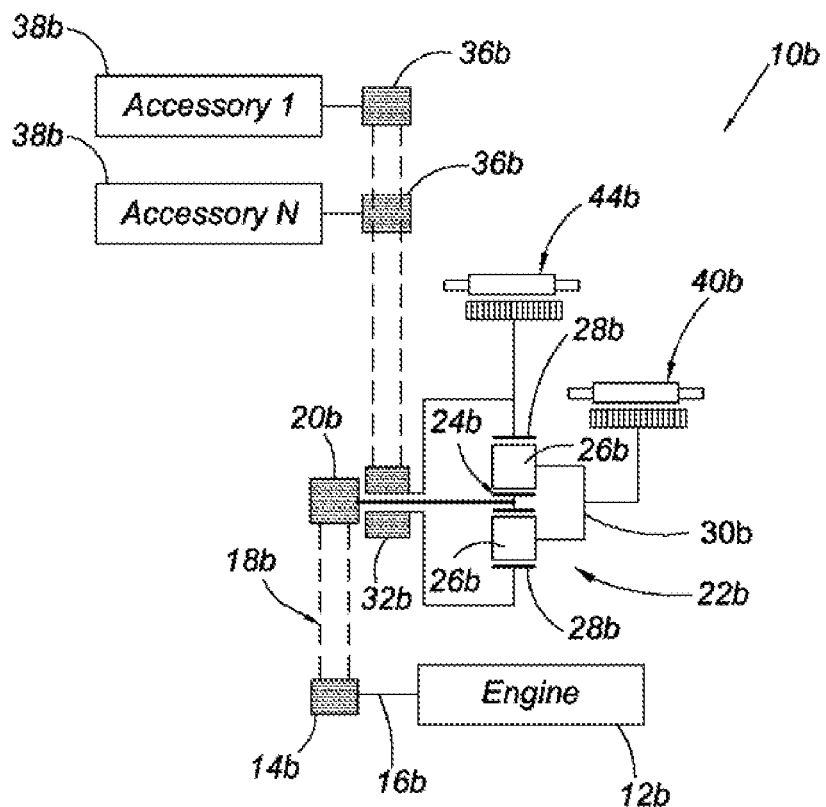
FIG. 3 is a more detailed schematic depiction of the accessory drive system of FIG. 1 in accordance with an alternate embodiment of the present invention.

Referring to FIG. 3, a SAAD system 10b is shown in accordance with an alternate embodiment of the present invention. The accessory drive input pulley 20b (which runs at a fixed ratio of engine speed) is operatively connected to the sun gear 24b of the planetary gear set 22b. The first motor/generator 40b is operatively connected to the planet carrier 30b of the planetary gear set 22b. The second motor/generator 44b is operatively connected to the ring gear 28b. The ring gear 28b of the planetary gear set 22b is also operatively connected to the accessory drive output pulley 32b. Therefore, in response to input from the engine 12b (via the sun gear 24b), the first motor/generator 40b (via the planet carrier 30b) and/or the second motor/generator 44b (via the ring gear 28b), the planetary gear set 22b can transfer output to the accessory drive output pulley 32b (via the ring gear 28b) and thereby drive the accessories 38b at a selectable rate. When the engine 12b is off, the motor/generators 40b, 44b are controllable to transfer torque via the planet carrier 30b and the ring gear 28b, respectively, in order to power the accessories 38b and/or to re-start the engine 12b.

Figure 4:
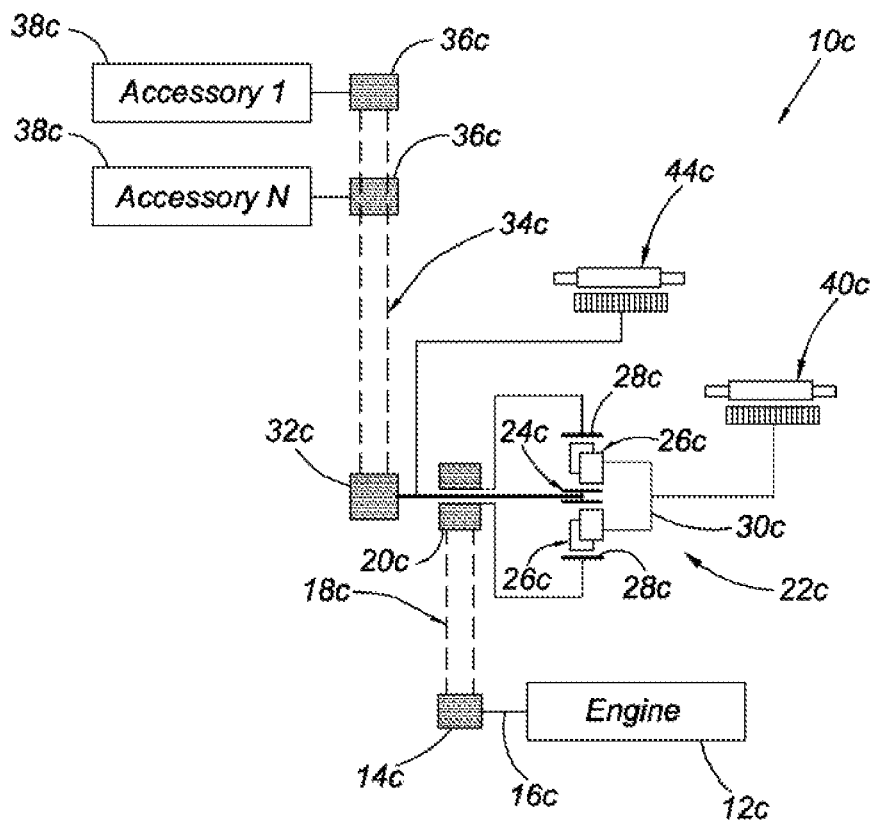
FIG. 4 is a more detailed schematic depiction of the accessory drive system of FIG. 1 in accordance with an alternate embodiment of the present invention.

Referring to FIG. 4, a SAAD system 10c is shown in accordance with an alternate embodiment of the present invention. The planetary gear set 22c of this embodiment preferably includes a double-pinion carrier 30c configuration. The accessory drive input pulley 20c (which runs at a fixed ratio of engine speed) is operatively connected to the ring gear 28c of the planetary gear set 22c. The first motor/generator 40c is operatively connected to the double-pinion carrier 30c of the planetary gear set 22c. The second motor/generator 44c is operatively connected to the sun gear 24c of the planetary gear set 22c. The sun gear 24c of the planetary gear set 22c is also operatively connected to the accessory drive output pulley 32c. Therefore, in response to input from the engine 12c (via the ring gear 28c), the first motor/generator 40c (via the double-pinion carrier 30c) and/or the second motor/generator 44c (via the sun gear 24c), the planetary gear set 22c can transfer output to the accessory drive output pulley 32c (via the sun gear 24c) and thereby drive the accessories 38c at a selectable rate. When the engine 12c is off, the motor/generators 40c, 44c are controllable to transfer torque via the double-pinion carrier 30c and the sun gear 24c, respectively, in order to power the accessories 38c and/or to re-start the engine 12c.

Figure 5:
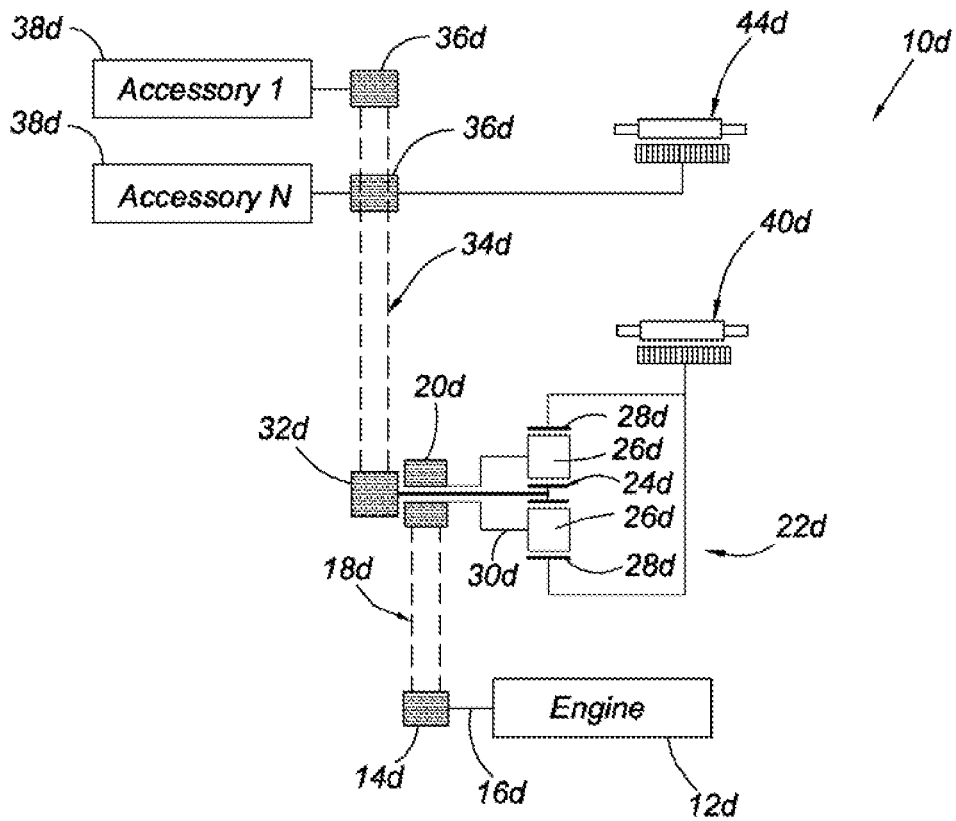
FIG. 5 is a more detailed schematic depiction of the accessory drive system of FIG. 1 in accordance with an alternate embodiment of the present invention.

Referring to FIG. 5, a SAAD system 10d is shown in accordance with an alternate embodiment of the present invention. The accessory drive input pulley 20d (which runs at a fixed ratio of engine speed) is operatively connected to the planet carrier 30d of the planetary gear set 22d. The first motor/generator 40d is operatively connected to the ring gear 28d of the planetary gear set 22d. The second motor/generator 44d is operatively connected to an accessory pulley 36d. The sun gear 24d of the planetary gear set 22d to operatively connected to the accessory drive output pulley 32d. Therefore, in response to input from the engine 12d (via the planet carrier 30d), the first motor/generator 40d (via the ring gear 28d) and/or the second motor/generator 44d (via an accessory pulley 36d), the planetary gear set 22d can transfer output to the accessory drive output pulley 32d (via the sun gear 24d) and thereby drive the accessories 38d at a selectable rate. When the engine 12d is off, the motor/generators 40d, 44d are controllable to transfer torque via the ring gear 28d and an accessory pulley 36d, respectively, in order to power the accessories 38d and/or to re-start the engine 12d.

Figure 6:
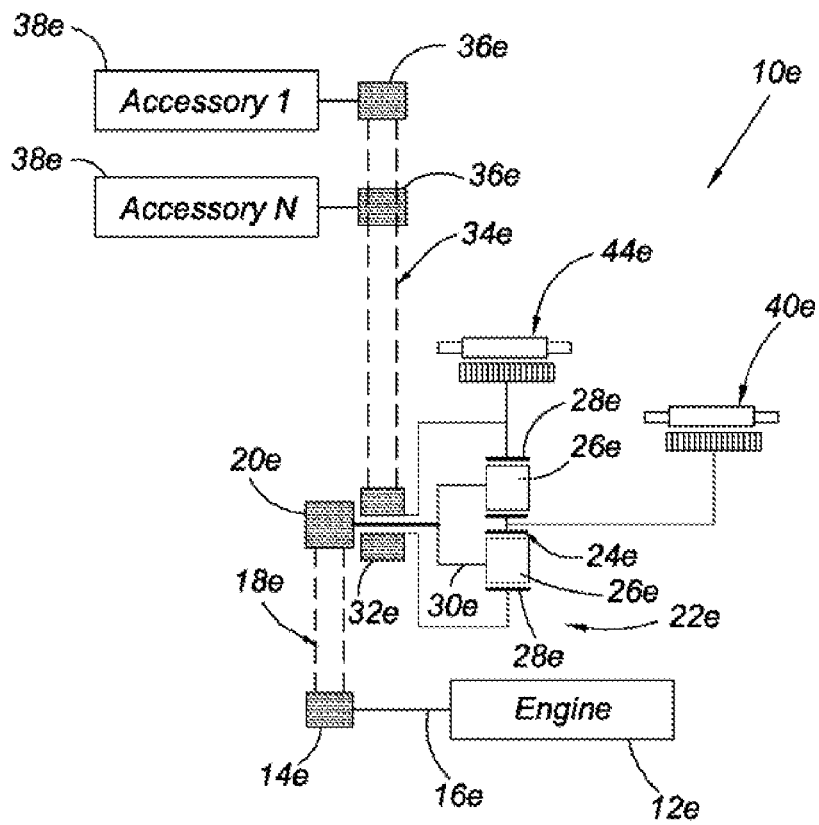
FIG. 6 is a more detailed schematic depiction of the accessory drive system of FIG. 1 in accordance with an alternate embodiment of the present invention.

Referring to FIG. 6, a SAAD system 10e is shown in accordance with an alternate embodiment of the present invention. The accessory drive input pulley 20e (which runs at a fixed ratio of engine speed) is operatively connected to the planet carrier 30e of the planetary gear set 22e. The first motor/generator 40e is operatively connected to the sun gear 24e of the planetary gear set 22e. The second motor/generator 44e is operatively connected to the ring gear 28e of the planetary gear set 22e. The ring gear 28e of the planetary gear set 22e is also operatively connected to the accessory drive output pulley 32e. Therefore, in response to input from the engine 12e (via the planet carrier 30e), the first motor/generator 40e (via the sun gear 24e) and/or the second motor/generator 44e (via the ring gear 28e), the planetary gear set 22e can transfer output to the accessory drive output pulley 32e (via the ring gear 28e) and thereby drive the accessories 38e at a selectable rate. When the engine 12e is off, the motor/generators 40e, 44e are controllable to transfer torque via the sun gear 24e and the ring gear 28e, respectively, in order to power the accessories 38e and/or to re-start the engine 12e.

Figure 7:
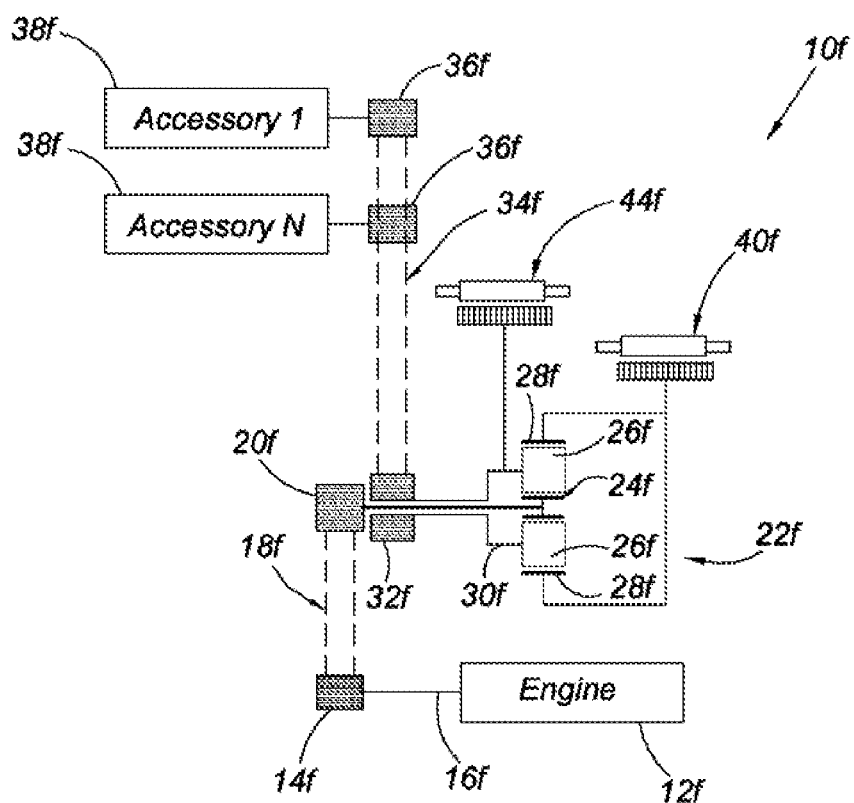
FIG. 7 is a more detailed schematic depiction of the accessory drive system of FIG. 1 in accordance with an alternate embodiment of the present invention.

Referring to FIG. 7, a SAAD system 10f is shown in accordance with an alternate embodiment of the present invention. The accessory drive input pulley 20f (which runs at a fixed ratio of engine speed) is operatively connected to the sun gear 24f of the planetary gear set 22f. The first motor/generator 40f is operatively connected to the ring gear 28f of the planetary gear set 22f. The second motor/generator 44f is operatively connected to the planet carrier 30f of the planetary gear set 22f. The planet carrier 30f of the planetary gear set 22f is also operatively connected to the accessory drive output pulley 32f. Therefore, in response to input from the engine 12f (via the sun gear 24f), the first motor/generator 40f (via the ring gear 24f) and/or the second motor/generator 44f (via the planet carrier 30f), the planetary gear set 22f can transfer output to the accessory drive output pulley 32f (via the planet carrier 30f) and thereby drive the accessories 38f at a selectable rate. When the engine 12f is off, the motor/generators 40f, 44f are controllable to transfer torque via the ring gear 28f and the planet carrier 30f, respectively, in order to power the accessories 38f and/or to re-start the engine 12f.

Figure 8:
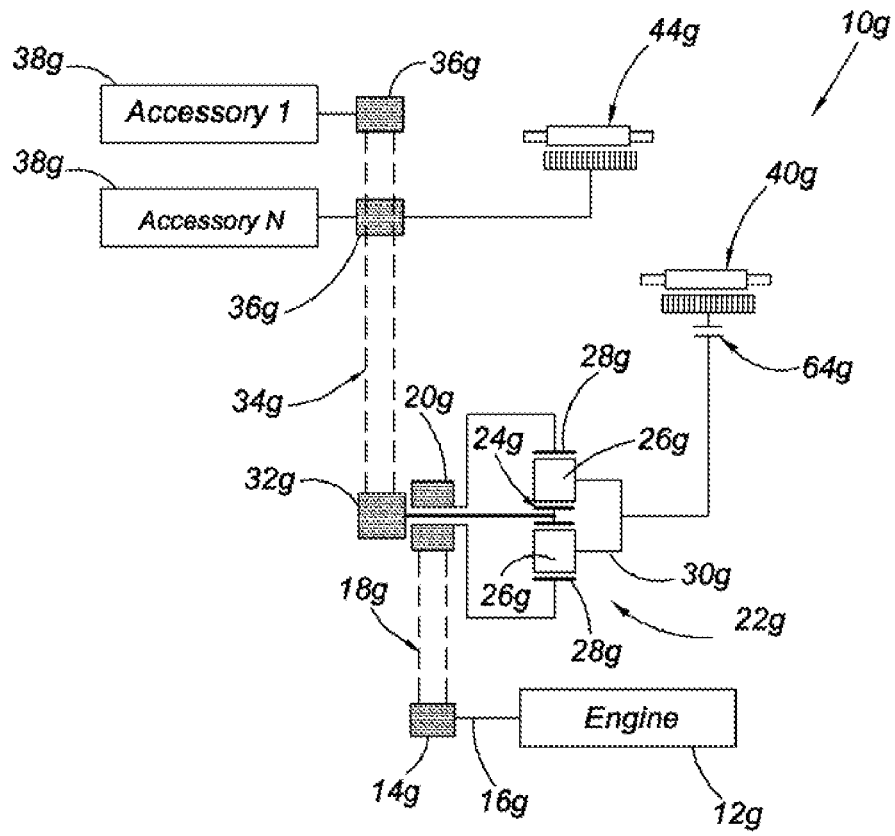
FIG. 8 is a more detailed schematic depiction of the accessory drive system of FIG. 1 in accordance with an alternate embodiment of the present invention.

Referring to FIG. 8, a SAAD system 10g is shown in accordance with an alternate embodiment of the present invention. The accessory drive input pulley 20g (which runs at a fixed ratio of engine speed) is operatively connected to the ring gear 28g of the planetary gear set 22g. A gear assembly 64g couples the first motor/generator 40g with the planet carrier 30g of the planetary gear set 22g. The second motor/generator 44g is operatively connected to one of the accessory pulleys 36g. The sun gear 24g of the planetary gear set 22g is operatively connected to the accessory drive output pulley 32g. Therefore, in response to input from the engine 12g (via the ring gear 28g), the first motor/generator 40g (via the planet carrier 30g) and/or the second motor/generator 44g (via an accessory drive pulley 36g), the planetary gear set 22g can transfer output to the accessory drive output pulley 32g (via the sun gear 24g) and thereby drive the accessories 38g at a selectable rate. When the engine 12g is off, the motor/generators 40f, 44f are controllable to transfer torque via the ring gear 28f and the planet carrier 30f, respectively, in order to power the accessories 38f and/or to re-start the engine 12f.

Figure 9:
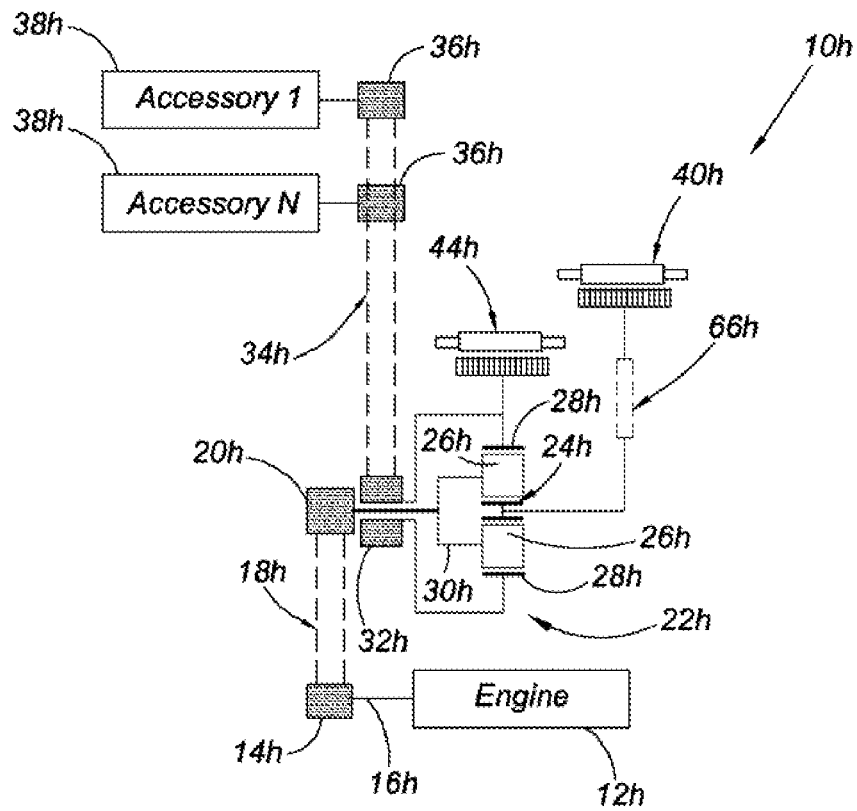
FIG. 9 is a more detailed schematic depiction of the accessory drive system of FIG. 1 in accordance with an alternate embodiment of the present invention.

Referring to FIG. 9, a SAAD system 10h is shown in accordance with an alternate embodiment of the present invention. The accessory drive input pulley 20h (which runs at a fixed ratio of engine speed) is operatively connected to the planet carrier 30h of the planetary gear set 22h. A third belt or chain 66h couples the first motor/generator 40h and the sun gear 24h of the planetary gear set 22h. The second motor/generator 44h is operatively connected to the ring gear 28h of the planetary gear set 22h. The ring gear 28h of the planetary gear set 22h is also operatively connected to the accessory drive output pulley 32h. Therefore, in response to input from the engine 12h (via the planet carrier 30h), the first motor/generator 40h (via the sun gear 24h) and/or the second motor/generator 44h (via the ring gear 28h), the planetary gear set 22h can transfer output to the accessory drive output pulley 32h (via the ring gear 28b) and thereby drive the accessories 38h at a selectable rate. When the engine 12h is off, the motor/generators 40h, 44h are controllable to transfer torque via the sun gear 24h and the ring gear 28h, respectively, in order to power the accessories 38h and/or to re-start the engine 12h.

While the best modes for carrying out the invention have been described in detail, those familiar with the art to which this invention relates will recognize various alternative designs and embodiments for practicing the invention within the scope of the appended claims.

The invention claimed is:

1. A starter alternator accessory drive system for a hybrid vehicle comprising:
   an engine;
   a crank pulley operatively connected to the engine;
   an accessory drive input pulley operatively connected to the crank pulley;
   an accessory;
   an accessory drive output pulley operatively connected to the accessory;
   a planetary gear set disposed between the accessory drive input pulley and the accessory drive output pulley to transfer output from the engine to the accessory;
   a first motor/generator operatively connected to the planetary gear set; and
   a second motor/generator operatively connected to the planetary gear set;
   wherein the first and second motor/generators are controllable to power the accessory via the planetary gear set at a selectable rate independent of engine speed, and to re-start the engine while simultaneously powering the accessory.

2. The starter alternator accessory drive system of claim 1, further comprising at least one belt or chain operatively connecting said accessory drive input pulley to said crank pulley.

3. The starter alternator accessory drive system of claim 1, further comprising a battery configured to transfer power to and receive power from the first and second motor/generators.

4. The starter alternator accessory drive system of claim 1, further comprising a controller operatively connected to the engine, the first motor/generator and the second motor/generator, said controller configured to calculate required speed and output torque values for the first and second motor/generators in order to control the speed at which the accessory is run.

5. A starter alternator accessory drive system for a hybrid vehicle comprising:
   a planetary gear set having a first, second, and third planetary member, wherein the first planetary member is operatively connected to an accessory drive input pulley, and the third planetary member is operatively connected to an accessory drive output pulley;
   an engine operatively connected to the accessory drive input pulley;
   a first motor/generator operatively connected to the second planetary member;
   a second motor/generator operatively connected to the accessory drive output pulley; and
   a plurality of accessories operatively connected to the accessory drive output pulley;
   wherein engine output is transferable through the planetary gear set to drive the plurality of accessories at a selectable rate, and the first and second motor/generators are controllable to run the plurality of accessories while the engine is off and to re-start the engine.

6. The starter alternator accessory drive system of claim 5, wherein the first planetary member is a ring gear member, the second planetary member is a sun gear member, and the third planetary member is a planet carrier member.

7. The starter alternator accessory drive system of claim 5, wherein the first planetary member is a sun gear member, the second planetary member is a planet carrier member, and the third planetary member is a ring gear member.

8. The starter alternator accessory drive system of claim 5, wherein the first planetary member is a ring gear member, the second planetary member is a planet carrier member, and the third planetary member is a sun gear member.

9. The starter alternator accessory drive system of claim 5, wherein the first planetary member is a planet carrier member, the second planetary member is a ring gear member, and the third planetary member is a sun gear member.

10. The starter alternator accessory drive system of claim 5, wherein the first planetary member is a planet carrier member, the second planetary member is a sun gear member, and the third planetary member is a ring gear member.

11. The staffer alternator accessory drive system of claim 5, wherein the first planetary member is a sun gear member, the second planetary member is a ring gear member, and the third planetary member is a planet carrier member.

12. The starter alternator accessory drive system of claim 5, further comprising a gear assembly operatively connecting the first motor/generator to the second planetary member.

13. The starter alternator accessory drive system of claim 5, further comprising a belt operatively connecting the first motor/generator to the second planetary member.

14. The starter alternator accessory drive system of claim 5, further comprising a chain operatively connecting the first motor/generator to the second planetary member.

15. A starter alternator accessory drive system for a hybrid vehicle comprising:
   a planetary gear set having a first, second, and third planetary member;
   one of plurality of pulleys connected by a belt member and a plurality of sprockets connected by a chain member operatively connecting an engine with the first planetary member;
   a first motor/generator operatively connected to the second planetary member;
   one of a plurality of pulleys connected by a belt member and a plurality of sprockets connected by a chain member operatively connecting a plurality of accessories to the third planetary member; and
   a second motor/generator operatively connected to the third planetary member;
   wherein engine output is transferable through the planetary gear set to drive the plurality of accessories at a selectable rate, and the first and second motor/generators are controllable to run the plurality of accessories while the engine is off and to re-start the engine.

16. The starter alternator accessory drive system of claim 15, further comprising a belt operatively connecting the first motor/generator to the second planetary member.

17. The starter alternator accessory drive system of claim 15, further comprising a chain operatively connecting the first motor/generator to the second planetary member.

18. The starter alternator accessory drive system of claim 15, further comprising a gear assembly operatively connecting one of the first and second motor/generators to the planetary gear set.

19. The starter alternator accessory drive system of claim 15, wherein the planetary gear set includes a single-pinion carrier.

20. The starter alternator accessory drive system of claim 15, wherein the planetary gear set includes a double-pinion carrier.

* * * * *